(12) United States Patent  
Watanabe

(10) Patent No.: US 11,565,467 B2  
(45) Date of Patent: Jan. 31, 2023

(54) PLASTICIZING APPARATUS, PLASTICIZING METHOD, AND THREE-DIMENSIONAL SHAPING APPARATUS

(71) Applicant: SEIKO EPSON CORPORATION, Tokyo (JP)

(72) Inventor: Manabu Watanabe, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 142 days.

(21) Appl. No.: 16/773,527

(22) Filed: Jan. 27, 2020

(65) Prior Publication Data

US 2020/0238611 A1  Jul. 30, 2020

(30) Foreign Application Priority Data

Jan. 28, 2019 (JP) .............................. JP2019-012013

(51) Int. Cl.
| | |
|---|---|
| *B29C 64/209* | (2017.01) |
| *B29C 64/314* | (2017.01) |
| *B29C 64/321* | (2017.01) |
| *B29C 64/295* | (2017.01) |
| *B33Y 30/00* | (2015.01) |
| *B33Y 40/00* | (2020.01) |

(52) U.S. Cl.
CPC .......... *B29C 64/209* (2017.08); *B29C 64/295* (2017.08); *B29C 64/314* (2017.08); *B29C 64/321* (2017.08); *B33Y 30/00* (2014.12); *B33Y 40/00* (2014.12)

(58) Field of Classification Search
CPC ... B29C 64/209; B29C 64/295; B29C 64/314; B29C 64/321; B33Y 30/00
See application file for complete search history.

(56) References Cited

FOREIGN PATENT DOCUMENTS

| | | | |
|---|---|---|---|
| JP | S4860762 A | | 8/1973 |
| JP | S61-262107 A | | 11/1986 |
| JP | H03-153311 A | | 7/1991 |
| JP | H04-073124 A | | 3/1992 |
| JP | H08-001731 A | | 1/1996 |
| JP | 10156907 A | * | 6/1998 |
| JP | 2007-245503 A | | 9/2007 |
| JP | 2010-000752 A | | 1/2010 |
| JP | 2010000752 A | * | 1/2010 |
| JP | 2012131115 A | * | 7/2012 |

* cited by examiner

*Primary Examiner* — Joseph S Del Sole  
*Assistant Examiner* — Mohamed K Ahmed Ali  
(74) *Attorney, Agent, or Firm* — Chip Law Group

(57) ABSTRACT

A plasticizing apparatus for plasticizing a material to form a molten material includes a screw in a columnar shape having a groove formed face, in which a material flow channel including a groove portion to be supplied with the material is formed, and a barrel having a screw opposed face, which is a face opposed to the groove formed face, and in which a sending-out hole for sending out the molten material is formed at a center, and a heating portion heating the material. The material flow channel has a recess provided at a center of the groove formed face, and the groove portion extending in a spiral shape toward an outer circumference of the groove formed face from the recess, and a heat insulating portion having a lower thermal conductivity than an outer circumferential portion in the screw is provided in at least a part of an inner circumferential portion including the recess in the screw.

5 Claims, 3 Drawing Sheets

FIG. 4

| | MATERIAL | CRYSTALLINE or AMORPHOUS | THERMAL DECOMPOSITION TEMPERATURE Td [°C] | MELTING POINT Tm [°C] | GLASS TRANSITION POINT Tg [°C] | BARREL SURFACE TEMPERATURE Tb [°C] | SCREW SURFACE TEMPERATURE Ts [°C] | (Ts−Tg) /(Tm−Tg) | EJECTION PROPERTY |
|---|---|---|---|---|---|---|---|---|---|
| SAMPLE 1 | PEEK | CRYSTALLINE | 450 | 341 | 143 | 400 | 180 | 0.187 | A |
| SAMPLE 2 | PEEK | CRYSTALLINE | 450 | 341 | 143 | 350 | 160 | 0.086 | C |
| SAMPLE 3 | PEEK | CRYSTALLINE | 450 | 341 | 143 | 383 | 170 | 0.136 | B |
| SAMPLE 4 | PP | CRYSTALLINE | 300 | 165 | 0 | 210 | 87 | 0.527 | A |
| SAMPLE 5 | ABS | AMORPHOUS | 260 | — | 80 | 210 | 87 | — | A |

PLASTICIZING APPARATUS, PLASTICIZING METHOD, AND THREE-DIMENSIONAL SHAPING APPARATUS

The present application is based on, and claims priority from JP Application Serial Number 2019-012013, filed on Jan. 28, 2019, the disclosure of which is hereby incorporated by reference herein in its entirety.

BACKGROUND

1. Technical Field

The present disclosure relates to a plasticizing apparatus, a plasticizing method, and a three-dimensional shaping apparatus.

2. Related Art

For example, JP-A-2010-000752 (Patent Document 1) discloses an apparatus including a barrel in which a heater is embedded, and a screw rotating on the barrel. In this apparatus, a material is supplied between the barrel and the screw, and the supplied material is melted by heating using the heater.

In the above-mentioned apparatus, the heater is provided in the barrel, and therefore, when the temperature of the heater is set high for appropriately melting the material in the vicinity of the screw, the temperature in the vicinity of the barrel becomes too high, and the material in the vicinity of the barrel is deteriorated, and discoloration or a decrease in strength of the material sent out from the apparatus may be caused. On the other hand, when the temperature of the heater is set low for appropriately maintaining the temperature in the vicinity of the barrel, the temperature in the vicinity of the screw becomes too low, and the material in the vicinity of the screw cannot be appropriately melted, and sending-out of the material from the apparatus may become unstable. In view of this, a technique capable of stably sending out a material by melting while suppressing deterioration of the material is provided.

SUMMARY

According to one aspect of the present disclosure, a plasticizing apparatus for plasticizing a material to form a molten material is provided. The plasticizing apparatus includes a screw in a columnar shape having a groove formed face, in which a material flow channel including a groove portion to be supplied with the material is formed, and a barrel having a screw opposed face, which is a face opposed to the groove formed face, and in which a sending-out hole for sending out the molten material is formed at a center, and a heating portion heating the material. The material flow channel has a recess provided at a center of the groove formed face, and the groove portion extending in a spiral shape toward an outer circumference of the groove formed face from the recess, and a heat insulating portion having a lower thermal conductivity than an outer circumferential portion in the screw is provided in at least apart of an inner circumferential portion including the recess in the screw.

BRIEF DESCRIPTION OF THE DRAWINGS

FIG. 4 is an explanatory view showing test results related to temperatures and an ejection property of a shaping material from a nozzle.

DESCRIPTION OF EXEMPLARY EMBODIMENTS

A. First Embodiment

Figure 1:
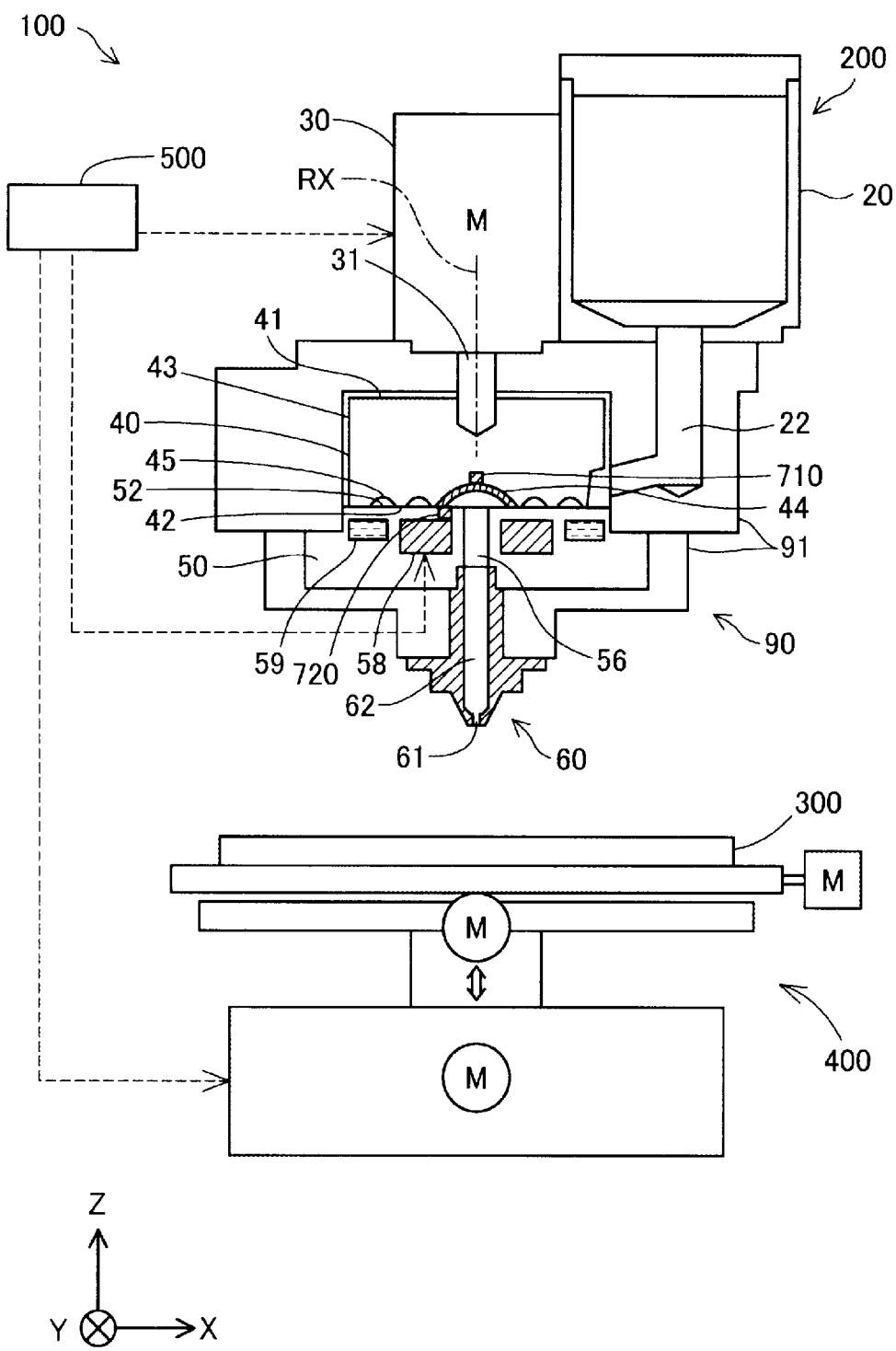
FIG. 1 is an explanatory view showing a schematic configuration of a three-dimensional shaping apparatus in a first embodiment.

FIG. 1 is an explanatory view showing a schematic configuration of a three-dimensional shaping apparatus 100 in a first embodiment. In FIG. 1, arrows along the X, Y, and Z directions orthogonal to one another are shown. The X direction and the Y direction are directions along the horizontal direction, and the Z direction is a direction along the vertical direction. In also the other drawings, arrows along the X, Y, and Z directions are shown as appropriate. The X, Y, and Z directions in FIG. 1 and the X, Y, and Z directions in the other drawings indicate the same directions.

The three-dimensional shaping apparatus 100 in this embodiment includes an ejection unit 200, a shaping table 300, a moving mechanism 400, and a controller 500. The ejection unit 200 includes a material supply portion 20, a plasticizing portion 90, and a nozzle 60. In the three-dimensional shaping apparatus 100 in this embodiment, a material supplied from the material supply portion 20 is plasticized by the plasticizing portion 90 under the control of the controller 500. The material plasticized by the plasticizing portion 90 is sent out from the plasticizing portion 90 as a shaping material and supplied to the nozzle 60. The shaping material supplied to the nozzle 60 is ejected onto the shaping table 300 from a nozzle hole 61 provided at a tip portion of the nozzle 60. By stacking the shaping material ejected from the nozzle hole 61 on the shaping table 300, a three-dimensional shaped article is shaped. The shaping material is sometimes referred to as "molten material". The plasticizing portion 90 is sometimes referred to as "plasticizing apparatus".

The moving mechanism 400 changes a relative position of the shaping table 300 and the ejection unit 200. In this embodiment, the moving mechanism 400 moves the shaping table 300 with respect to the ejection unit 200. The moving mechanism 400 in this embodiment is constituted by a three-axis positioner for moving the shaping table 300 in three axis directions of the X, Y, and Z directions by driving forces of three motors. Each motor drives under the control of the controller 500. The moving mechanism 400 need not be configured to move the shaping table 300, but may be configured to move the ejection unit 200 without moving the shaping table 300. The moving mechanism 400 may be configured to move both the shaping table 300 and the ejection unit 200.

The controller 500 is constituted by a computer including one or more processors, a main storage device, and an input/output interface for performing signal input/output to/from the outside. In this embodiment, the controller 500 controls the operation of the ejection unit 200 and the moving mechanism 400 by execution of a program or a command read on the main storage device by the processor and executes a shaping process for shaping a three-dimensional shaped article. In the operation, movement of a three-dimensional relative position of the ejection unit 200 with respect to the shaping table 300 is included. The controller 500 may be constituted by a combination of a plurality of circuits instead of a computer.

In the material supply portion 20, a material in a state of a pellet, a powder, or the like is housed. In this embodiment, polyether ether ketone (PEEK) in a pellet form is used as the material. Polyether ether ketone is a crystalline thermoplastic resin. The material supply portion 20 in this embodiment is constituted by a hopper. The material housed in the material supply portion 20 is supplied to the plasticizing portion 90 through a supply channel 22 provided below the material supply portion 20.

The plasticizing portion 90 includes a driving motor 30, a flat screw 40, a barrel 50, and a screw case 91. The plasticizing portion 90 supplies a shaping material in a paste form formed by melting at least a part of the material in a solid state supplied from the material supply portion 20 to the nozzle 60. The flat screw 40 is sometimes simply referred to as "screw". The screw case 91 is sometimes simply referred to as "case".

The screw case 91 houses the flat screw 40. To an upper face of the screw case 91, the driving motor 30 is fixed. A rotating shaft 31 of the driving motor 30 is coupled to an upper face 41 of the flat screw 40.

The flat screw 40 has a substantially columnar shape whose height in a direction along a central axis RX is smaller than the diameter. The flat screw 40 is disposed in the screw case 91 so that the central axis RX becomes parallel to the Z direction. The flat screw 40 rotates around the central axis RX in the screw case 91 by a torque generated by the driving motor 30.

The flat screw 40 has a groove formed face 42 at an opposite side to the upper face 41 in a direction along the central axis RX. In the groove formed face 42, a material flow channel 45 is formed. A detailed configuration of the groove formed face 42 of the flat screw 40 will be described later with reference to FIG. 2.

At a surface of an inner circumferential portion of the flat screw 40, a heat insulating portion 44 is provided. The "inner circumferential portion" refers to a portion in a columnar shape within ⅓ of the radius in the flat screw 40. In this embodiment, the heat insulating portion 44 is provided at a surface of the material flow channel 45. The thermal conductivity of the heat insulating portion 44 is lower than the thermal conductivity of the main body of the flat screw 40. The heat insulating portion 44 is not provided in an outer circumferential portion of the flat screw 40. The "outer circumferential portion" refers to a portion in a cylindrical shape outside the inner circumferential portion in the flat screw 40. A detailed configuration of the heat insulating portion 44 will be described later with reference to FIG. 2.

In this embodiment, the main body of the flat screw 40 is formed from stainless steel. The heat insulating portion 44 is provided by forming a zirconia coating film having a smaller thermal conductivity than stainless steel at the surface of the flat screw 40. The zirconia coating film is formed at the surface of the flat screw 40 by, for example, thermal spraying. The main body of the flat screw 40 may be formed from, for example, another metal material such as a titanium alloy, a resin material, or a ceramic material. The heat insulating portion 44 may be formed from a material other than zirconia as long as it is a material having a lower thermal conductivity than the main body of the flat screw 40. The material of the flat screw 40 or the material of the heat insulating portion 44 may be any as long as it is a material having heat resistance and strength to such an extent that the material supplied from the material supply portion 20 can be plasticized.

In this embodiment, a screw temperature sensor 710 is provided at a surface of the material flow channel 45 at the central axis RX of the flat screw 40. The screw temperature sensor 710 acquires a screw surface temperature Ts that is the surface temperature of the material flow channel 45 in the flat screw 40. As the screw temperature sensor 710, for example, a thermocouple can be used. The information regarding the screw surface temperature Ts acquired by the screw temperature sensor 710 is transmitted to the controller 500.

The barrel 50 is fixed below the flat screw 40 in the screw case 91. The barrel 50 has a screw opposed face 52 opposed to the groove formed face 42 of the flat screw 40. In the screw opposed face 52, a sending-out hole 56 communicating with the nozzle hole 61 is provided at a position on the central axis RX of the flat screw 40. A detailed configuration of the screw opposed face 52 of the barrel 50 will be described later with reference to FIG. 3.

The barrel 50 has a built-in heater 58 at a position opposed to the material flow channel 45 of the flat screw 40. The temperature of the heater 58 is controlled by the controller 500. The heater 58 is sometimes referred to as "heating portion".

In this embodiment, a barrel temperature sensor 720 is provided in an outer circumferential portion of the sending-out hole 56 in the screw opposed face 52 of the barrel 50. The barrel temperature sensor 720 acquires a barrel surface temperature Tb that is the surface temperature of the screw opposed face 52 in the barrel 50. As the barrel temperature sensor 720, for example, a thermocouple can be used. The information regarding the barrel surface temperature Tb acquired by the barrel temperature sensor 720 is transmitted to the controller 500.

In this embodiment, a cooling water channel 59 is provided at an outer circumferential side of the heater 58 in the barrel 50. In the cooling water channel 59, cooling water circulates by a pump (not shown) so as to prevent the temperature of the barrel 50 from becoming too high. The cooling water channel 59 may be provided in the vicinity of the barrel 50 in the screw case 91 instead of in the barrel 50. The cooling water channel 59 need not be provided.

In the nozzle 60, a nozzle channel 62 and a nozzle hole 61 are provided. In the nozzle channel 62, the shaping material is supplied from the sending-out hole 56 of the plasticizing portion 90. The nozzle hole 61 is a portion with a reduced channel cross section provided at an end portion at a side communicating with the atmosphere of the nozzle channel 62. The forming material supplied to the nozzle channel 62 is ejected from the nozzle hole 61. In this embodiment, the nozzle 60 is provided with the nozzle hole 61 in a circular shape. The diameter of the nozzle hole 61 is referred to as "nozzle diameter Dn". The shape of the nozzle hole 61 is not limited to a circular shape, and may be a quadrangular shape or the like.

Figure 2:
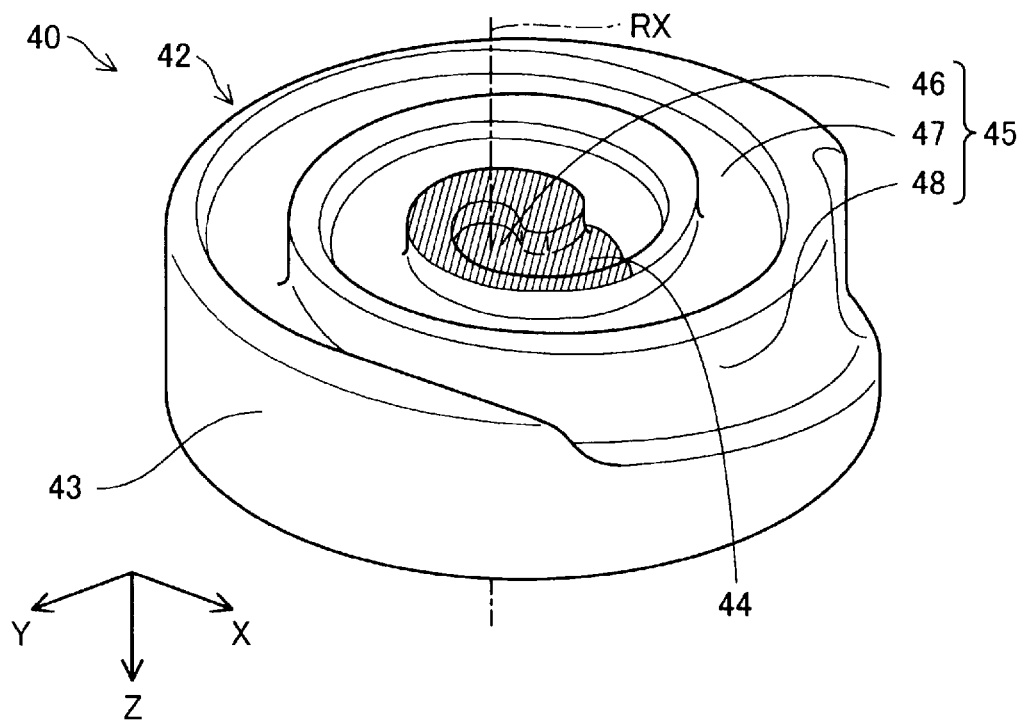
FIG. 2 is a perspective view showing a configuration of a groove formed face of a flat screw in the first embodiment.

FIG. 2 is a perspective view showing a configuration of the groove formed face 42 of the flat screw 40 in this embodiment. The flat screw 40 shown in FIG. 2 is shown in a state where the vertical positional relationship shown in FIG. is reversed for facilitating the understanding of the technique. In the flat screw 40 shown in FIG. 2, the heat insulating portion 44 is hatched. In the groove formed face 42 of the flat screw 40, the material flow channel 45 is formed as described above. The material flow channel 45 includes a central portion 46, a spiral portion 47, and a material introduction portion 48.

The central portion 46 is a circular recess formed around the central axis RX of the flat screw 40. The central portion 46 is opposed to the sending-out hole 56 provided in the barrel 50.

The spiral portion 47 is a groove extending in a spiral shape so as to draw an arc toward the outer circumference of the groove formed face 42 with the central portion 46 as the center. The spiral portion 47 may be configured to extend in an involute curve shape or in a helical shape. One end of the spiral portion 47 is coupled to the central portion 46. The other end of the spiral portion 47 is coupled to the material introduction portion 48.

The material introduction portion 48 is a groove that is provided at the outer peripheral edge of the groove formed face 42 and that is wider than the spiral portion 47. The material introduction portion 48 is continuous to a side face 43 of the flat screw 40. The material introduction portion 48 introduces the material supplied from the material supply portion 20 into the spiral portion 47 through the supply channel 22. In FIG. 2, a form in which a single streak of spiral portion 47 and a single streak of material introduction portion 48 are provided toward the outer circumference from the central portion 46 of the flat screw 40 is shown, however, a plurality of streaks of spiral portions 47 and a plurality of streaks of material introduction portions 48 may be provided toward the outer circumference from the central portion 46 of the flat screw 40. The spiral portion 47 and the material introduction portion 48 are also referred to as "groove portion".

In the inner circumferential portion of the flat screw 40, the central portion 46 and apart of the spiral portion 47 are included. In this embodiment, the heat insulating portion 44 is provided at the surface of the central portion 46 and the surface of the part of the spiral portion 47 included in the inner circumferential portion.

Figure 3:
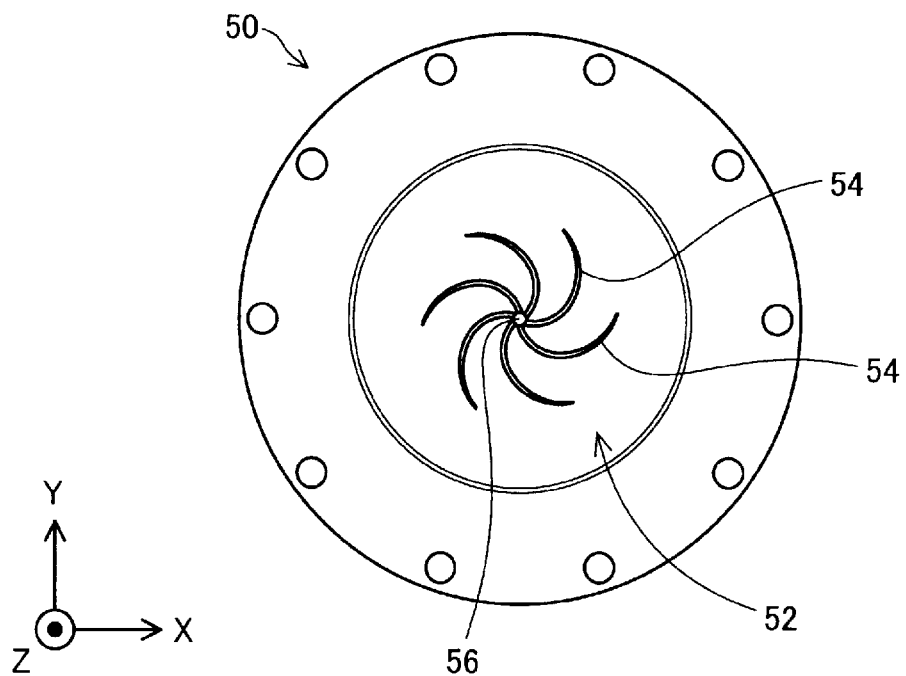
FIG. 3 is a top view showing a configuration of a screw opposed face of a barrel in the first embodiment.

FIG. 3 is a top view showing a configuration of the screw opposed face 52 of the barrel 50 in this embodiment. As described above, at the center of the screw opposed face 52, the sending-out hole 56 communicating with the nozzle 60 is formed. Around the sending-out hole 56 in the screw opposed face 52, a plurality of guide grooves 54 are formed. One end of each of the guide grooves 54 is coupled to the sending-out hole 56, and each guide groove 54 extends in a spiral shape toward the outer circumference of the screw opposed face 52 from the sending-out hole 56. Each guide groove 54 has a function of guiding the shaping material to the sending-out hole 56.

According to the configuration of the three-dimensional shaping apparatus 100 described above, when the shaping process for shaping a three-dimensional shaped article is executed by the controller 500, the material in the material supply portion 20 is supplied to the material introduction portion 48 from the side face 43 of the rotating flat screw 40 through the supply channel 22. The material supplied into the material introduction portion 48 is transported into the spiral portion 47 by the rotation of the flat screw 40.

At least a part of the material transported into the spiral portion 47 is melted by the rotation of the flat screw 40 and heating by the built-in heater 58 in the barrel 50, whereby the shaping material in a paste form having fluidity is formed.

The shaping material is transported to the central portion 46 in the spiral portion 47 by the rotation of the flat screw 40, and the shaping material is sent out to the sending-out hole 56 from the central portion 46. The shaping material supplied to the nozzle 60 through the sending-out hole 56 is ejected onto the shaping table 300 from the nozzle hole 61. The flowing amount of the shaping material ejected from the nozzle hole 61 is referred to as "ejection amount".

In this embodiment, in the shaping process, the controller 500 controls the temperature of the heater 58 so as to satisfy all the conditions from the following Condition (A) to Condition (D). Condition (A): The screw surface temperature Ts is higher than the glass transition point Tg of the material. Condition (B): A relationship among the screw surface temperature Ts, the glass transition point Tg of the material, and the melting point Tm of the material satisfies the following formula (1).

$$Ts \geq Tg + 0.187 \times (Tm - Tg) \tag{1}$$

Condition (C): The barrel surface temperature Tb is lower than the thermal decomposition temperature Td of the material. Condition (D): The screw surface temperature Ts is lower than the barrel surface temperature Tb. In order to satisfy all the conditions from the above-mentioned Condition (A) to Condition (D), the controller 500, for example, controls the temperature of the heater 58 by feedback control using the screw surface temperature Ts acquired by the screw temperature sensor 710 and the barrel surface temperature Tb acquired by the barrel temperature sensor 720. The controller 500 may control the temperature of the heater 58 by referring to a map showing the relationship among the temperature of the heater 58, the screw surface temperature Ts, and the barrel surface temperature Tb, or may control the temperature of the heater 58 based on a previously determined function.

FIG. 4 is an explanatory view showing test results by examining a relationship among the barrel surface temperature Tb, the screw surface temperature Ts, and an ejection property of the shaping material from the nozzle 60. In FIG. 4, test results of Sample 1 to Sample 5 performed under different conditions, respectively, are shown. In this test, a relationship among the barrel surface temperature Tb measured using the barrel temperature sensor 720, the screw surface temperature Ts measured using the screw temperature sensor 710, and the ejection property of the shaping material from the nozzle 60 was examined. In FIG. 4, as the test results, symbols "A", "B", and "C" were assigned in descending order of ejection property. When the shaping material ejected from the nozzle 60 is not deteriorated, and also the ejection amount of the shaping material from the nozzle 60 is stable, the ejection property was determined to be favorable. "The shaping material is not deteriorated" means that the property of the shaping material is not changed to such an extent that discoloration or a decrease in strength is caused. "The ejection amount of the shaping material is stable" means that an expected ejection amount from the nozzle 60 is continuously obtained.

In Sample 1, polyether ether ketone (PEEK) in a pellet form was used as the material. Polyether ether ketone is a crystalline thermoplastic resin. Polyether ether ketone has a thermal decomposition temperature Td of 450 degree Celsius, a melting point Tm of 341 degree Celsius, and a glass transition point Tg of 143 degree Celsius. The ejection property of the shaping material from the nozzle 60 was examined by setting the barrel surface temperature Tb to 400 degree Celsius and the screw surface temperature Ts to 180 degree Celsius, and as a result, a favorable ejection property was obtained. In Sample 1, the relationship among the screw surface temperature Ts, the glass transition point Tg of the material, and the melting point Tm of the material was as follows: (Ts−Tg)/(Tm−Tg)=0.187.

In Sample 2, the same polyether ether ketone (PEEK) in a pellet form as that of Sample 1 was used as the material. The ejection property of the shaping material from the nozzle 60 was examined by setting the barrel surface temperature Tb to 350 degree Celsius and the screw surface temperature Ts to 160 degree Celsius, and as a result, the material in the material flow channel 45 of the flat screw 40 was not sufficiently melted, and the ejection of the shaping material from the nozzle 60 was unstable. In Sample 2, the relationship among the screw surface temperature Ts, the glass transition point Tg of the material, and the melting point Tm of the material was as follows: $(Ts-Tg)/(Tm-Tg)=0.086$.

In Sample 3, the same polyether ether ketone (PEEK) in a pellet form as that of Sample 1 was used as the material. The ejection property of the shaping material from the nozzle 60 was examined by setting the barrel surface temperature Tb to 383 degree Celsius and the screw surface temperature Ts to 170 degree Celsius, and as a result, although a more favorable ejection property than in the case of Sample 2 was obtained, the material in the material flow channel 45 of the flat screw 40 was not sufficiently melted, and the ejection of the shaping material from the nozzle 60 was unstable. In Sample 3, the relationship among the screw surface temperature Ts, the glass transition point Tg of the material, and the melting point Tm of the material was as follows: $(Ts-Tg)/(Tm-Tg)=0.136$.

In Sample 4, a polypropylene resin (PP) in a pellet form was used as the material. The polypropylene resin is a crystalline thermoplastic resin. The polypropylene resin has a thermal decomposition temperature Td of 300 degree Celsius, a melting point Tm of 165 degree Celsius, and a glass transition point Tg of 0 degree Celsius. The ejection property of the shaping material from the nozzle 60 was examined by setting the barrel surface temperature Tb to 210 degree Celsius and the screw surface temperature Ts to 87 degree Celsius, and as a result, a favorable ejection property was obtained. In Sample 4, the relationship among the screw surface temperature Ts, the glass transition point Tg of the material, and the melting point Tm of the material was as follows: $(Ts-Tg)/(Tm-Tg)=0.527$.

In Sample 5, an acrylonitrile-butadiene-styrene resin (ABS) in a pellet form was used as the material. The acrylonitrile-butadiene-styrene resin is an amorphous thermoplastic resin. The acrylonitrile-butadiene-styrene resin has a thermal decomposition temperature Td of 260 degree Celsius and a glass transition point Tg of 80 degree Celsius. The ejection property of the shaping material from the nozzle 60 was examined by setting the barrel surface temperature Tb to 210 degree Celsius and the screw surface temperature Ts to 87 degree Celsius, and as a result, a favorable ejection property was obtained. The acrylonitrile-butadiene-styrene resin is an amorphous thermoplastic resin, and therefore does not have a clear melting point Tm.

Therefore, when a crystalline thermoplastic resin is used as the material, in order to realize a favorable ejection property of the shaping material to be ejected from the nozzle 60, it is preferred that the screw surface temperature Ts satisfies the above formula (1).

According to the three-dimensional shaping apparatus 100 of this embodiment described above, the heat insulating portion 44 is provided at the surface of the inner circumferential portion of the flat screw 40, and therefore, heat from the heater 58 of the barrel 50 can be easily retained in the vicinity of the inner circumferential portion of the flat screw 40. Due to this, even when the temperature of the heater 58 is set lower than the thermal decomposition temperature of the material, the material in the vicinity of the inner circumferential portion of the flat screw 40 can be appropriately melted. Accordingly, the shaping material can be stably supplied to the nozzle 60 from the sending-out hole 56 of the barrel 50 while suppressing deterioration of the shaping material, so that the shaping material can be stably ejected from the nozzle 60. In particular, in this embodiment, heat from the heater 58 of the barrel 50 can be easily retained in the vicinity of the inner circumferential portion of the flat screw 40, so that the temperature of the outer circumferential portion can be made lower than the temperature of the inner circumferential portion of the flat screw 40, and thus, the material can be appropriately melted in the inner circumferential portion without inhibiting the transport of the material in the outer circumferential portion.

Further, in this embodiment, the temperature of the heater 58 is controlled by the controller 500 so that the barrel surface temperature Tb is lower than the thermal decomposition temperature Td of the material and the screw surface temperature Ts is higher than the glass transition point Tg of the material. Therefore, the material in the vicinity of the flat screw 40 can be more reliably melted while more reliably suppressing deterioration of the material in the vicinity of the barrel 50.

Further, in this embodiment, a crystalline thermoplastic resin is used as the material, and the temperature of the heater 58 is controlled so that the screw surface temperature Ts satisfies the above formula (1). Therefore, with respect to the crystalline thermoplastic resin, the material in the vicinity of the flat screw 40 can be more reliably melted.

Further, in this embodiment, the screw temperature sensor 710 is provided at the center in the circumferential direction of the flat screw 40, and the controller 500 controls the temperature of the heater 58 using the screw surface temperature Ts acquired by the screw temperature sensor 710. Therefore, the material at the center of the flat screw 40 near the sending-out hole 56 can be appropriately melted, and thus, sending-out failure of the shaping material from the sending-out hole 56 can be more reliably suppressed.

In this embodiment, the material of polyether ether ketone (PEEK) in a pellet form is used, however, as the material used in the ejection unit 200, for example, a material shaping a three-dimensional shaped article using any of various materials such as a material having thermoplasticity, a metal material, and a ceramic material as a main material can also be adopted. Here, the "main material" refers to a principal material for forming the shape of the three-dimensional shaped article and means a material whose content is 50 wt % or more in the three-dimensional shaped article. In the above-mentioned shaping material, a material obtained by melting such a main material singly, or a material formed into a paste by melting a part of the components contained together with the main material is included.

When a material having thermoplasticity is used as the main material, the shaping material is formed by plasticization of the material in the plasticizing portion 90. The "plasticization" refers to melting by applying heat to the material having thermoplasticity. Further, the "melting" also refers to softening by heating the material having thermoplasticity to a temperature not lower than the glass transition point thereof so as to exhibit fluidity.

As the material having thermoplasticity, for example, any one or a combination of two or more of the following thermoplastic resin materials can be used.

Examples of Thermoplastic Resin Material general-purpose engineering plastics such as a polypropylene resin (PP), a polyethylene resin (PE), a polyacetal resin (POM), a polyvinyl chloride resin (PVC), a polyamide resin (PA), an acrylonitrile-butadiene-styrene resin (ABS), a polylactic acid resin (PLA), a polyphenylene sulfide resin (PPS), polyether ether ketone (PEEK), polycarbonate (PC), modified polyphenylene ether, polybutylene terephthalate, and polyethylene terephthalate, and engineering plastics such as polysulfone, polyethersulfone, polyphenylene sulfide, polyarylate, polyimide, polyamideimide, polyetherimide, and polyether ether ketone In the material having thermoplasticity, a pigment, a metal, a ceramic, or other than these, an additive such as a wax, a flame retardant, an antioxidant, or a heat stabilizer, or the like may be mixed. The material having thermoplasticity is converted into a plasticized and molten state by the rotation of the flat screw 40 and the heating by the heater 58 in the plasticizing portion 90. The shaping material formed in this manner is cured by decreasing the temperature after being ejected from the nozzle hole 61.

The material having thermoplasticity is desirably injected from the nozzle hole 61 in a completely molten state by being heated to a temperature not lower than the glass transition point thereof. For example, an ABS resin has a glass transition point of about 120° C. and the temperature thereof when it is injected from the nozzle hole 61 is desirably about 200° C. In order to inject the shaping material in a high temperature state in this manner, a heater may be provided around the nozzle hole 61. The "completely molten state" refers to a state where a material having thermoplasticity that is not melted is not present, and for example, when a thermoplastic resin in a pellet form is used as the material, it refers to a state where a solid material in a pellet form does not remain.

In the ejection unit 200, in place of the above-mentioned material having thermoplasticity, for example, the following metal material may be used as the main material. In this case, it is desirable that a component melting when forming the shaping material is mixed in a powder material obtained by pulverizing the following metal material into a powder, and the resulting material is fed to the plasticizing portion 90.

Examples of Metal Material single metals of magnesium (Mg), iron (Fe), cobalt (Co), chromium (Cr), aluminum (Al), titanium (Ti), copper (Cu), and nickel (Ni), or alloys containing one or more of these metals Examples of Alloy a maraging steel, stainless steel, cobalt-chromium-molybdenum, a titanium alloy, a nickel alloy, an aluminum alloy, a cobalt alloy, and a cobalt-chromium alloy In the ejection unit 200, in place of the above-mentioned metal material, a ceramic material can be used as the main material. As the ceramic material, for example, an oxide ceramic such as silicon dioxide, titanium dioxide, aluminum oxide, or zirconium oxide, a non-oxide ceramic such as aluminum nitride, or the like can be used. When a metal material or a ceramic material as described above is used as the main material, the shaping material disposed in the shaping table 300 maybe cured by, for example, irradiation with a laser or sintering with hot air or the like.

The powder material of the metal material or the ceramic material to be fed to the material supply portion 20 maybe a mixed material obtained by mixing a plurality of types of single metal powders or alloy powders or ceramic material powders. Further, the powder material of the metal material or the ceramic material may be coated with, for example, a thermoplastic resin as exemplified above or a thermoplastic resin other than those exemplified above. In this case, the material may be configured to exhibit fluidity by melting the thermoplastic resin in the plasticizing portion 90.

To the powder material of the metal material or the ceramic material to be fed to the material supply portion 20, for example, a solvent as described below can also be added. As the solvent, one type or a combination of two or more types selected from the following solvents can be used.

Examples of Solvent water, (poly)alkylene glycol monoalkyl ethers such as ethylene glycol monomethyl ether, ethylene glycol monoethyl ether, propylene glycol monomethyl ether, and propylene glycol monoethyl ether, acetate esters such as ethyl acetate, n-propyl acetate, iso-propyl acetate, n-butyl acetate, and iso-butyl acetate, aromatic hydrocarbons such as benzene, toluene, and xylene, ketones such as methyl ethyl ketone, acetone, methyl isobutyl ketone, ethyl n-butyl ketone, diisopropyl ketone, and acetyl acetone, alcohols such as ethanol, propanol, and butanol, tetra-alkyl ammonium acetates, sulfoxide-based solvents such as dimethyl sulfoxide and diethyl sulfoxide, pyridine-based solvents such as pyridine, γ-picoline, and 2,6-lutidine, tetra-alkyl ammonium acetates (for example, tetra-butyl ammonium acetate, etc.), ionic liquids such as butyl carbitol acetate, and the like In addition thereto, for example, a binder as described below can also be added to the powder material of the metal material or the ceramic material to be fed to the material supply portion 20.

Examples of Binder an acrylic resin, an epoxy resin, a silicone resin, a cellulosic resin, or another synthetic resin, or PLA (polylactic acid), PA (polyamide), PPS (polyphenylene sulfide), PEEK (polyether ether ketone), or other thermoplastic resins

B. Other Embodiments (B1) In the three-dimensional shaping apparatus 100 of the above-mentioned respective embodiments, when, for example, an amorphous thermoplastic resin such as an acrylonitrile-butadiene-styrene resin (ABS) is used as the material, the controller 500 may control the temperature of the heater 58 so as to satisfy all the Condition (A), Condition (C), and Condition (D), excluding Condition (B) described above. In this case, even if an amorphous thermoplastic resin that does not have a melting point Tm is used, the material in the vicinity of the inner circumferential portion of the flat screw 40 is appropriately melted while suppressing deterioration of the material in the vicinity of the barrel 50, and the shaping material can be supplied to the nozzle 60.

(B2) In the three-dimensional shaping apparatus 100 of the above-mentioned respective embodiments, the surface temperature of the material flow channel 45 on the central axis RX of the flat screw 40 is used as the screw surface temperature Ts. On the other hand, the screw surface temperature Ts may be the surface temperature of the material flow channel 45 included in the inner circumferential portion of the flat screw 40, and may be, for example, the surface temperature of the spiral portion 47 included in the inner circumferential portion. Even in this case, the material in the vicinity of the inner circumferential portion of the flat screw 40 is appropriately melted by heating from the heater 58 while suppressing deterioration of the material in the vicinity of the barrel 50, and the shaping material can be supplied to the nozzle 60.

(B3) In the three-dimensional shaping apparatus 100 of the above-mentioned respective embodiments, the heat insulating portion 44 is provided at the surface of the material flow channel 45 included in the inner circumferential portion of the flat screw 40. On the contrary, the heat insulating portion 44 may be provided inside the flat screw 40 included in the inner circumferential portion of the flat screw 40. Even in this case, the material in the vicinity of the inner circumferential portion of the flat screw 40 is appropriately melted by heating from the heater 58 while suppressing deterioration of the material in the vicinity of the barrel 50, and the shaping material can be supplied to the nozzle 60. When the heat insulating portion 44 is provided inside the flat screw 40, it is preferred to provide the heat insulating portion 44 at a position near the barrel 50 inside the flat screw 40.

C. Other Aspects

The present disclosure is not limited to the above-mentioned embodiments, but can be realized in various aspects without departing from the gist thereof. For example, the present disclosure can also be realized in the following aspects. The technical features in the above-mentioned embodiments corresponding to technical features in the respective aspects described below may be appropriately replaced or combined for solving part or all of the problems of the present disclosure or achieving part or all of the effects of the present disclosure. Further, the technical features maybe appropriately deleted unless they are described as essential features in the present specification.

(1) According to a first aspect of the present disclosure, a plasticizing apparatus for plasticizing a material to form a molten material is provided. The plasticizing apparatus includes a screw in a columnar shape having a groove formed face, in which a material flow channel including a groove portion to be supplied with the material is formed, and a barrel having a screw opposed face, which is a face opposed to the groove formed face, and in which a sending-out hole for sending out the molten material is formed at a center, and a heating portion heating the material. The material flow channel has a recess provided at a center of the groove formed face, and the groove portion extending in a spiral shape toward an outer circumference of the groove formed face from the recess, and a heat insulating portion having a lower thermal conductivity than an outer circumferential portion in the screw is provided in at least a part of an inner circumferential portion including the recess in the screw.

According to the plasticizing apparatus of this aspect, by the heat insulating portion provided in the inner circumferential portion of the screw, heat from the heating portion of the barrel can be easily retained in the vicinity of the screw, and therefore, the material in the vicinity of the screw is appropriately melted and can be stably sent out from the sending-out hole while suppressing deterioration of the material in the vicinity of the barrel. Accordingly, the molten material can be stably sent out from the sending-out hole while suppressing deterioration of the material.

(2) In the plasticizing apparatus of the above aspect, the heating portion may perform the heating so that a surface temperature Tb at the screw opposed face of the barrel is lower than a thermal decomposition temperature Td of the material, and a surface temperature Ts in the material flow channel of the screw is higher than a glass transition point Tg of the material.

According to the plasticizing apparatus of this aspect, the material in the vicinity of the screw can be more reliably melted while more reliably suppressing deterioration of the material in the vicinity of the barrel.

(3) In the plasticizing apparatus of the above aspect, when a crystalline thermoplastic resin is used as the material, the heating portion may perform the heating so that the surface temperature Tb at the screw opposed face of the barrel is lower than the thermal decomposition temperature Td of the material, and a relationship among the surface temperature Ts in the material flow channel of the screw, the glass transition point Tg of the material, and a melting point Tm of the material satisfies the following formula (1).

$$Ts \geq Tg + 0.187 \times (Tm - Tg) \qquad (1)$$

According to the plasticizing apparatus of this aspect, with respect to the crystalline material, the material in the vicinity of the screw can be more reliably melted.

(4) In the plasticizing apparatus of the above aspect, the surface temperature Ts in the material flow channel of the screw may be a temperature at a surface of the recess.

According to the plasticizing apparatus of this aspect, the material can be appropriately melted in a central portion of the screw near the sending-out hole, and therefore, the molten material can be more stably sent out from the sending-out hole.

(5) According to a second aspect of the present disclosure, a plasticizing method for plasticizing a material to form a molten material is provided. In the plasticizing method, the material is supplied between a screw in a columnar shape having a groove formed face, in which a material flow channel including a groove portion is formed, and a barrel having a screw opposed face, which is a face opposed to the groove formed face, and in which a sending-out hole for sending out the molten material is formed at a center, and a heating portion heating the material, and the material flow channel has a recess provided at a center of the groove formed face, and the groove portion extending in a spiral shape toward an outer circumference of the groove formed face from the recess, and the material is heated using the heating portion while suppressing heat transfer by a heat insulating portion that is provided in at least a part of an inner circumferential portion including the recess in the screw and that has a lower thermal conductivity than an outer circumferential portion in the screw.

According to the plasticizing method of this aspect, by performing the heating by the heating portion while suppressing heat transfer by the heat insulating portion provided in the inner circumferential portion of the screw, the material in the vicinity of the screw is appropriately melted and can be stably sent out from the sending-out hole while suppressing deterioration of the material in the vicinity of the barrel. Accordingly, the molten material can be stably sent out from the sending-out hole while suppressing deterioration of the material.

(6) According to a third aspect of the present disclosure, a three-dimensional shaping apparatus is provided. The three-dimensional shaping apparatus includes a nozzle ejecting a molten material, a plasticizing portion including a screw in a columnar shape having a groove formed face, in which a material flow channel including a groove portion to be supplied with the material is formed, and a barrel having a screw opposed face, which is a face opposed to the groove formed face, and in which a sending-out hole communicating with the nozzle is formed at a center, and a heating portion heating the material, and a controller controlling the heating portion. The material flow channel has a recess provided at a center of the groove formed face, and the groove portion extending in a spiral shape toward an outer circumference of the groove formed face from the recess, and a heat insulating portion having a lower thermal conductivity than an outer circumferential portion in the screw is provided in at least apart of an inner circumferential portion including the recess in the screw.

According to the three-dimensional shaping apparatus of this aspect, by the heat insulating portion provided in the inner circumferential portion of the screw, heat from the heating portion of the barrel can be easily retained in the vicinity of the screw, and therefore, the material in the vicinity of the screw is appropriately melted and can be stably supplied to the nozzle while suppressing deterioration of the material in the vicinity of the barrel. Accordingly, the molten material can be stably ejected from the nozzle while suppressing deterioration of the material.

The present disclosure can also be realized in various aspects other than the plasticizing apparatus. For example, it can be realized in aspects of a plasticizing method, a three-dimensional shaping apparatus, etc.

What is claimed is:

1. A plasticizing apparatus for plasticizing a material to form a molten material, comprising: a screw in a columnar shape having a groove formed face, in which a material flow channel including a groove portion to be supplied with the material is formed; a screw temperature sensor acquiring a surface temperature (Ts) in the material flow channel of the screw, wherein the screw temperature sensor is provided at a center in a circumferential direction of the screw; a barrel having a screw opposed face, which is a face opposed to the groove formed face, and in which a sending-out hole for sending out the molten material is formed at a center, and a heating portion heating the material; a barrel temperature sensor acquiring a surface temperature (Tb) of the screw opposed face, wherein the barrel temperature sensor is in an outer circumferential portion in the screw opposed face of the barrel; a controller controlling the heating portion using the surface temperature (Ts) in the material flow channel of the screw acquired by the screw temperature sensor, and the surface temperature (Tb) of the screw opposed face acquired by the barrel temperature sensor, wherein the material flow channel has a recess provided at a center of the groove formed face, and the groove portion extending in a spiral shape toward an outer circumference of the groove formed face from the recess, a plurality of guide grooves are formed around the sending-out hole in the screw opposed face, one end of each of the plurality of guide grooves is coupled to the sending-out hole, and each guide groove of the plurality of guide grooves extends in a spiral shape toward the outer circumferential portion in the screw opposed face from the sending-out hole; and a heat insulating portion having a lower thermal conductivity than the outer circumferential portion in the screw is provided in at least a part of an inner circumferential portion including the recess in the screw.

2. The plasticizing apparatus according to claim 1, wherein the heating portion performs the heating so that the surface temperature (Tb) at the screw opposed face of the barrel is lower than a thermal decomposition temperature (Td) of the material, and the surface temperature (Ts) in the material flow channel of the screw is higher than a glass transition point (Tg) of the material.

3. The plasticizing apparatus according to claim 2, wherein when a crystalline thermoplastic resin is used as the material, the heating portion performs the heating so that the surface temperature (Tb) at the screw opposed face of the barrel is lower than the thermal decomposition temperature (Td) of the material, and a relationship among the surface temperature (Ts) in the material flow channel of the screw, the glass transition point (Tg) of the material, and a melting point (Tm) of the material satisfies the following formula (1):

$$Ts \geq Tg + 0.187 \times (Tm - Tg) \tag{1}$$

4. The plasticizing apparatus according to claim 2, wherein the surface temperature (Ts) in the material flow channel of the screw is a temperature at a surface of the recess.

5. A three-dimensional shaping apparatus, comprising:
a nozzle ejecting a molten material;
a plasticizing portion including a screw in a columnar shape having a groove formed face, in which a material flow channel including a groove portion to be supplied with the material is formed, a screw temperature sensor acquiring a surface temperature (Ts) in the material flow channel of the screw, wherein the screw temperature sensor is provided at a center in a circumferential direction of the screw;
a barrel having a screw opposed face, which is a face opposed to the groove formed face, and in which a sending-out hole communicating with the nozzle is formed at a center, and a heating portion heating the material; a barrel temperature sensor acquiring a surface temperature (Tb) of the screw opposed face, wherein the barrel temperature sensor is in an outer circumferential portion in the screw opposed face of the barrel;
a controller controlling the heating portion using the surface temperature (Ts) in the material flow channel of the screw acquired by the screw temperature sensor, and the surface temperature (Tb) of the screw opposed face acquired by the barrel temperature sensor, wherein the material flow channel has a recess provided at a center of the groove formed face, and the groove portion extending in a spiral shape toward an outer circumference of the groove formed face from the recess, and
a heat insulating portion having a lower thermal conductivity than the outer circumferential portion in the screw is provided in at least a part of an inner circumferential portion including the recess in the screw.

* * * * *